United States Patent [19]

Twerdochlib

[11] Patent Number: 4,870,859
[45] Date of Patent: Oct. 3, 1989

[54] FLOWMETER CONTROLLER FOR AN AIR INLEAKAGE MONITORING SYSTEM

[75] Inventor: Michael Twerdochlib, Oviedo, Fla.

[73] Assignee: Westinghouse Electric Corp., Pittsburgh, Pa.

[21] Appl. No.: 160,421

[22] Filed: Feb. 25, 1988

[51] Int. Cl.⁴ .............................................. G01F 5/00
[52] U.S. Cl. ...................................................... 73/203
[58] Field of Search ................. 73/202, 203, 195, 197; 137/110

[56] References Cited

U.S. PATENT DOCUMENTS

| | | | |
|---|---|---|---|
| 851,709 | 4/1907 | Thompson | 91/31 |
| 1,681,762 | 4/1928 | Connet | 73/203 |
| 2,630,820 | 3/1953 | Gray | 137/110 |
| 3,803,912 | 4/1975 | Ohno | 73/197 |
| 4,135,550 | 1/1979 | Andersson | 251/5 |
| 4,178,938 | 12/1979 | Au | 251/61.1 |
| 4,340,079 | 7/1982 | Smith | 251/61.1 |
| 4,461,173 | 7/1984 | Olin | 73/202.5 |
| 4,522,116 | 6/1985 | Tartaglino | 251/61.1 |
| 4,653,321 | 3/1987 | Cunningham et al. | 73/197 |

FOREIGN PATENT DOCUMENTS

| | | | |
|---|---|---|---|
| 1122116 | 1/1962 | Fed. Rep. of Germany | 251/61.1 |
| 2641196 | 3/1978 | Fed. Rep. of Germany | 251/61.1 |
| 2801605 | 7/1978 | Fed. Rep. of Germany | 251/61.1 |
| 0007218 | 1/1984 | Japan | 73/202.5 |

Primary Examiner—Herbert Goldstein

[57] ABSTRACT

A method and apparatus for controlling the operation of a normally open bypass valve in a steam turbine air inleakage exhaust vent pipe. The valve is used to bypass a flowmeter connected in a bypass pipe parallel with the valve. The flowmeter provides signals indicative of bypassed flow. The method and apparatus compares the signals from the flowmeter to a reference signal corresponding to a first predetermined flow rate and generates a valve closure signal if the flow through the flowmeter is less than the predetermined flow rate. If the valve is closed, the signals from the flowmeter are used to display the actual air inleakage exhaust rate. If the flow exceeds a second predetermined value, a signal is generated to open the valve for bypassing the exhaust through the valve around the flowmeter. During the second mode of operation, the flowmeter indicates only approximate inleakage exhaust flow rate. If the flow drops below the first predetermined value, the valve is again closed and the flow rate is measured by the flowmeter.

3 Claims, 4 Drawing Sheets

FLOWMETER CONTROLLER FOR AN AIR INLEAKAGE MONITORING SYSTEM

This invention relates to air leakage monitors for system turbines and, more particularly, to a method and apparatus for controlling operation of a flowmeter in such monitors.

BACKGROUND OF THE INVENTION

Volumetric flow rates at which gases travel through closed pipes are at times measured by placing a flowmeter directly in the pipe flow path. When relatively low levels of flow, e.g., two to fifty cubic feet per minute (CFM), are monitored in relatively large pipes, e.g., pipes six or more inches in diameter, the low level flow may be bypassed through a small pipe in order to increase the velocity of fluid flow and thereby improve the accuracy of measurement. For example, air inleakage in steam turbines is actively exhausted in order to minimize corrosion of turbine components and to reduce vibration in low pressure turbine blading. Efforts are made to keep air inleakage rates below ten CFM during normal operating conditions, but rates may range up to 2800 CFM during turbine start up. High compression ratio pumps designed to exhaust this wide range of flow must operate under low back pressure. Otherwise, excessive exhaust back pressures may damage the pump seals. Consequently, the vent pipes which exhaust this air are at least six inches in diameter and may be larger for long pipe lengths in order to minimize rises in back pressure when the pumps displace large volumes of air.

Velocity based flowmeters which have been used for measuring volumetric exhaust rates in these vent pipes have required a minimum flow velocity of approximately 50 feet per minute in order to maintain an acceptable level of accuracy. However, the velocity of a one CFM flow through a six inch pipe is on the order of only five feet per minute. Therefore it has been necessary to bypass turbine exhaust air through a flow monitor having a markedly smaller inside diameter than the vent pipe in order to bring the exhaust air velocity into an acceptable range for measuring volumetric flow rates. Similar constraints exist for positive displacement flowmeter but for different reasons. This latter type flowmeter reads low rates (2–50 CFM) with good accuracy but must be bypassed at higher flow rates to reduce flow through the meter. When a flowmeter is connected in parallel with the vent pipe, a bypass valve used to divert exhaust flow to the flowmeter must completely seal off the vent pipe in order to effect continuous monitoring. When the exhaust flow rate increases, e.g., due to a sudden inleakage of air to the turbine system, the bypass valve must be quickly opened in order to avoid excessive back pressure which would result from moving the increased volume of gas through the relatively small diameter flowmeter.

Applicant has developed one form of bypass valve which accomplishes this quick opening using a bladder valve as a control valve. The bladder valve is essentially an oblong balloon or bladder fixed in position within a flow pipe such that it can be expanded or contracted by control of gas pressure in the bladder. In this valve, operation was based on differential pressure measurements, i.e., pressure in the vent pipe is used to control bladder valve operation. It has been found that this form of control may result in oscillations of the control valve and may also provide a misleading low gas flow reading when the control valve is open.

SUMMARY OF THE INVENTION

It is an object of the present invention to provide a method and apparatus for control of a bypass or flow control valve which overcomes the above noted disadvantages of earlier systems.

It is another object of the present invention to provide a method and apparatus for control of a bypass valve which is relatively inexpensive and reliable.

It is a further object of the present invention to provide a method and apparatus for control of a bypass valve which does not require differential pressure measurement.

On one form, the present invention is illustrated in combination with a normally closed, fast acting bypass or control valve in which the valve is an inflatable bladder positioned in a large diameter flow tube. The valve is closed by inflating the bladder with suitably low pressure gas to seal off relatively low pressure through the tube. The valve is opened by exhausting the gas from the bladder. In a failure mode, pressure in the tube in excess of bladder pressure will sufficiently collapse the bladder so as to allow fluid in the tube to flow around the bladder.

In a preferred embodiment of the invention, the control valve is positioned to divert low pressure gases being exhausted through a steam turbine vent pipe to a flowmeter positioned in a valve bypass pipe. The flowmeter operates in two distinct modes. In a first flow measurement mode, gas flow is fully diverted, by closure of the control valve, through the flowmeter. In a second valve control mode, the flowmeter is used to control the bypass valve and does not provide a direct flow measurement. Signals generated by the flowmeter indicative of vent pipe flow rates are used to distinguish between the two modes. In order to provide gas flow through the flowmeter when the control valve is fully open, some restriction may be placed in the vent pipe.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
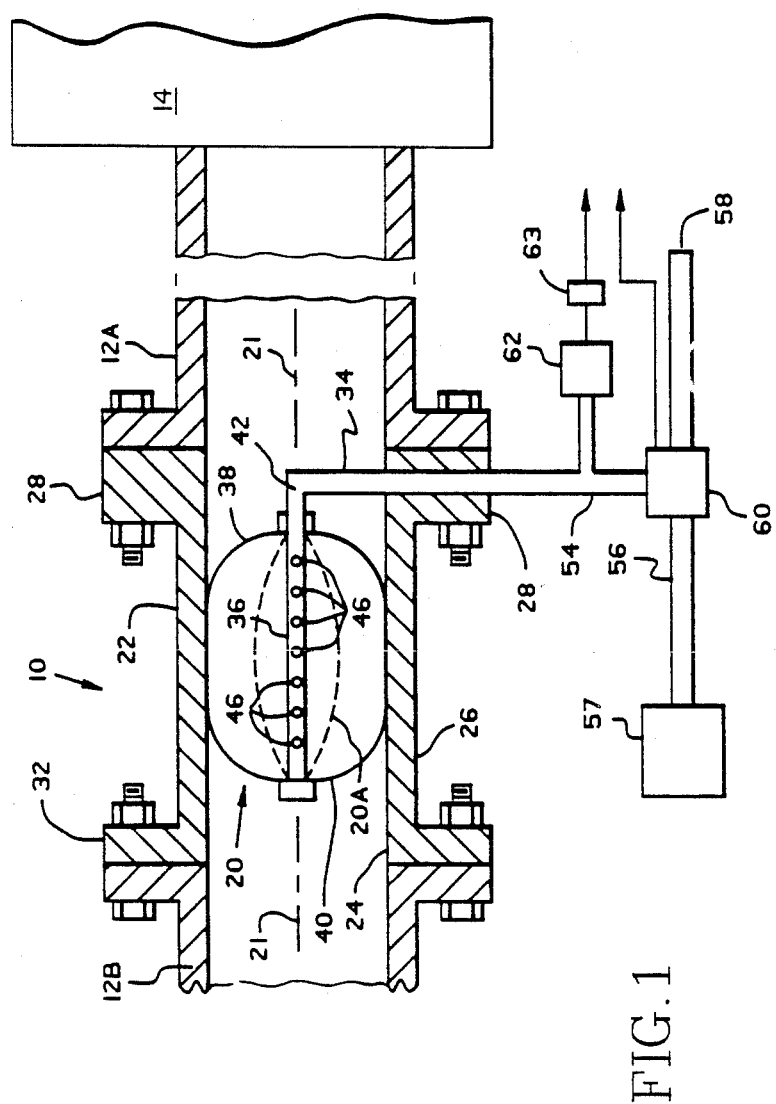
FIG. 1 is a partial cross-sectional view taken transverse to a direction of flow for illustrating details of one form of bypass valve.

With reference to FIG. 1 there is illustrated one form of bypass valve system 10 for sealing of a normally low pressure gas flow between first and second segments 12A and 12B of a vent pipe which removes air inleakage from a large steam turbine system 14. The bypass valve system 10 comprises an inflatable bladder 20 positioned about a central axis 21 within a tube 22 having an annular inner wall 24, an outer wall 26, a first end 28 adapted for connection to the first vent pipe segment 12A and a second tube end 32 adapted for connection to the second vent pipe segment 12B. The bladder 20 may be formed from an elastomeric material such as, for example, vulcanized or synthetic rubber.

A rigid bladder pipe 34 extends into the tube 22 through the inner wall 24 to transmit inflation gas to and from the bladder 20 and to secure the bladder against flow forces along the tube. The bladder 20 is removably supported along its axis by a cannula 36 extending hermetically through a first end 38 of the bladder 20 to a second end 40 of the bladder. The first end 42 of the cannula 36 is releasably threaded to the bladder pipe 34. The cannula 36 includes a plurality of spaced apart openings 46 to effect rapid inflation of the bladder 20 from a collapsed state indicated by phantom lines 20A in FIG. 1.

An exterior segment 54 of the bladder pipe 34 which extends out of the tube 22 is selectably connected in fluid communication with either a gas supply line 56 or a vent 58 by means of a two position solenoid valve 60. The supply line 56 receives pressurized gas from an inflation pump 57. The pressure of the gas provided by the inflation pump 57 is slightly greater, e.g., less than one psig, than the relatively low pressure gas normally flowing through the first vent pipe segment 12A. A pressure monitor 62, connected along the exterior segment 54 of the bladder pipe 34 is in fluid communication with the bladder 20. The pressure monitor 62 is coupled to an electric or hydraulic switch 63 which provides a warning signal when bladder pressure falls below the minimum pressure needed to fully inflate the bladder 20. The warning signal, provided by the switch 63 when the bladder pipe 34 is connected to the gas supply line 56, indicates that a significant gas leak exists in the bladder 20 which prevents the bladder 20 from becoming fully inflated. A flow impedance may be added to the gas supply line 56 between the inflation pump 57 and the solenoid valve 60 in order to detect less significant gas leaks.

The method of operating the bypass valve system 10 to seal off a normally low pressure gas flow includes the step of positioning the solenoid valve 60 to place the bladder 20 in fluid communication with the gas supply line 56. When this occurs, the bladder 20 inflates to the inflation pump pressure. The supply line 56 is kept in fluid communication with the bladder 20 in order to overcome minor bladder leaks. If gas leaks prevent the bladder 20 from fully inflating, a warning signal is provided by the electric or hydraulic switch 63. When the pressure of gas flow between the first and second vent pipe segments 12A and 12B exceeds the preselected value, the solenoid valve 60 may be repositioned to place the bladder 20 in fluid communication with the vent 58 causing the bladder to deflate.

Figure 3:
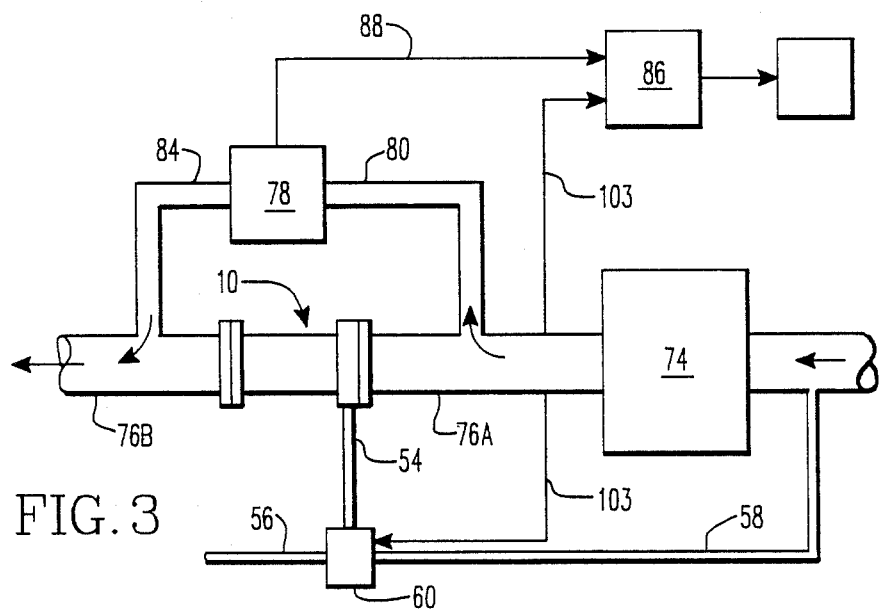
FIG. 3 is a schematic representation of a bypass valve control system in accordance with the present invention.

FIG. 3 illustrates a bypass valve 10 in an air inleakage monitor (AIM) system 70 for measuring the volumetric flow rate of air inleakage being evacuated from a condenser 72 of a steam turbine system. Reference numbers in FIG. 3 which correspond to reference numbers in FIG. 1 refer to similar components previously described for the bypass valve system 10.

The bladder bypass valve system 10 is positioned between the first vent pipe segment 76A and 76B. An exhaust pump 74, positioned between the first vent pipe segment 76A and the condenser 72, evacuates air inleakage from the condenser 72 through the vent pipe segments 76A and 76B. The exhaust pump 74 may comprise a vacuum pump or a hogger in combination with a steam ejector. A flowmeter 78 is positioned to receive gas from a first small diameter pipe 80 connected to the tube 22 on a first side 82 of the inflatable bladder 20 and adjacent the first tube end 28. A second small diameter pipe 84 is positioned to return gas from the flowmeter 78 to the tube 22 on a second side 85 of the inflatable bladder 20 adjacent the second tube end 32.

An electrical circuit or microprocessor based controller 86 is coupled through first and second signal lines 88 and 90 to monitor data from the flowmeter 78 and the pressure switch 63. A second pressure monitor 94, positioned between the vacuum pump 74 and the bypass valve system 68, provides the controller 86, through a third line 96, a signal indicating whether there is a relatively high back pressure in the pipe 80. A third pressure monitor 100, positioned in the condenser 72, provides an early warning of increased air inleakage and corresponding relatively high condenser back pressure to the controller 86 through a fourth signal line 102.

Based on preselected criteria the controller 86 regulates the position of the solenoid valve 60 through a fifth signal line 103 to either provide the bladder 20 with inflation pressure from the gas supply line 56 or to deflate the bladder 20 through the vent 58. If rapid bladder inflation is desired, the pump 57 may be a relatively high volume gas source connected through the parallel combination of a fast closing solenoid stop valve 104 and a flow impedance 106.

The controller 86 operates a solenoid stop valve 104 through a sixth signal line 108 to provide short bursts of relatively high volume flow gas from the pump 57 for inflating the bladder 20. When the solenoid valve 104 is shut, a parallel impedance 106, which may be a small diameter orifice, provides a constant source of low pressure, low volume gas flow through the supply line 56 for maintaining bladder inflation pressure. This impedance 106 increases the sensitivity of the pressure monitor 62 for detecting small bladder leaks. In order to rapidly deflate the bladder 20, the vent 58 is coupled to the partial vacuum provided by the pump 74 along the relatively low pressure pipe 110 between the pump 74 and the condenser 72.

The method for measuring flow rates with the AIM system 70 is as follows. Under steady state turbine conditions, when air inleakage is expected to be relatively low, flow from the exhaust pump 74 may be diverted to the flowmeter 78 without causing significant pump back pressure. Upon a determination that back pressures measured by the monitors 94 and 100 are acceptably low, the controller 86 provides a signal through the fifth signal line 103 to position the solenoid valve 60 to receive gas from the supply line 56 and inflate the bladder 20. This completely seals off the relatively low pressure gas flow directly through the tube 22 to the second vent pipe segment 76B. If the inflation pump 57 and supply line 56 provide a high volume gas source, the fast closing solenoid stop valve 104 will be opened by the controller 86 for a predetermined brief period of time in order to quickly inflate the bladder 20 and seal off flow through the second vent pipe segment 76B. After the controller 86 closes the solenoid stop valve 104, a relatively low maximum flow will be sustained through the impedance 106 in order to overcome any minor inflation leaks in the bladder 20. Larger leaks, preventing full inflation of the bladder 20, are detected by the controller 86 through the pressure switch 63. With the bladder 20 inflated, the flowmeter 78 provides the controller 86 with a signal through line 88 which is indicative of volumetric gas flow rate between the first and second pipe segments 76A and 76B.

A controller command is sent through the fifth signal line 103 to open the bypass valve 68 whenever a signal from the flowmeter 78 or from either of the pressure monitors 94 and 100 exceeds a preselected value. The solenoid valve 60 responds to the controller command by sealing off the supply line 56 and opening flow from the bladder pipe 34 through the vent 58. If the vent 58 is open to the atmosphere, the bladder 20 will collapse under its own elastromeric forces and any back pressure in the tube 22. If the vent 58 is coupled to the partial vacuum of the relatively low pressure pipe 110, the bladder will more quickly collapse. If controller regulation of the bypass valve system is rendered ineffective or if the solenoid valve 60 becomes stuck, leaving the supply line 56 coupled to the bladder 20, the bypass valve system will nevertheless allow air to pass once the vacuum pump back pressure exceeds the inflation pressure provided by the supply line 56. When pressure measured by either of the monitors 94 or 100 is used as a criterion for deflating the bladder 20, the controller 86 may be programmed to delay inflation of the bladder 20 for a predetermined period after bladder deflation occurs. This prevents continuous repetitive cycling of the bypass valve between open and closed positions during periods of high air inleakage.

Figure 2:
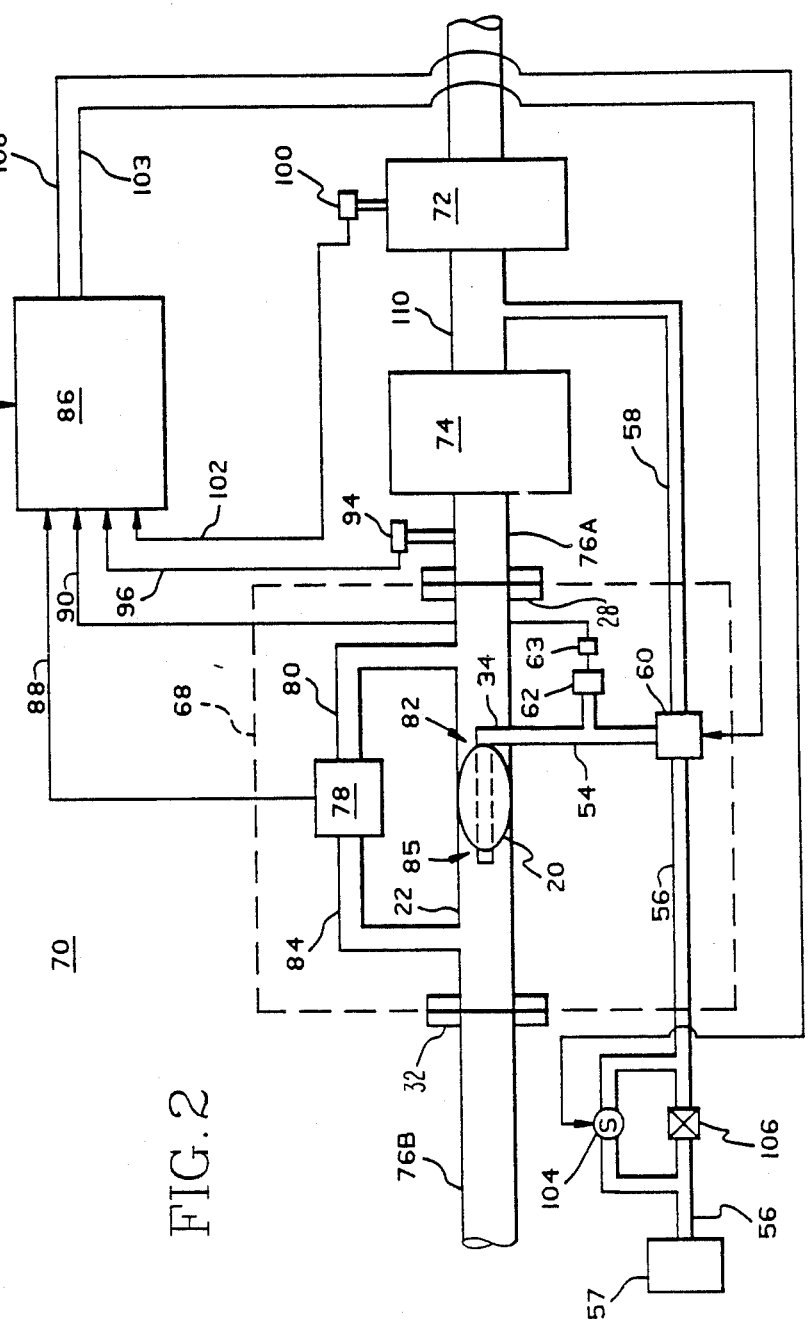
FIG. 2 is a schematic representation of a bypass flowmeter monitoring system for a steam turbine utilizing the bypass valve of FIG. 1.

Referring now to FIG. 3, there is shown an embodiment of the present invention as applied to the AIM system 70 of FIG. 2 in which like members refer to similar components in each system. The primary component differences can be seen in the back of the pressure monitor 62, the pressure monitor 94 and pressure monitor 100. It will be recalled that the valve 10 closes to divert gas through the flowmeter 78 at flow rates less than a preselected value, typically about 50 CFM. At flow rates above the selected value, the valve 10 opens to allow gas to partially bypass the meter 78. Flow rates above the selected value can be measured with reduced accuracy. As was described above, the control valve 10 was operated in response to differential pressure which sometimes resulted in oscillations of the valve. A manual reset or timer was used to limit such oscillations. In the inventive system of FIG. 3, the valve 10 is controlled by the flowmeter 78.

Flowmeter 78 is operated in two distinct modes. Below the selected flow rate for opening of valve 10, typically about 50 CFM, the flowmeter 78 operates in a "flow measurement mode". This mode may extend over the range of about 2 CFM to about 51 CFM. Above 51 CFM, the valve 10 is opened and the flowmeter 78 operates in a "valve control mode," and does not provide a direct flow measurement.

For purpose of description, it can be assumed that the flowmeter 78 provides an electrical output signal on line 88 which is proportional to the gas flow rate through the meter, e.g., the meter may provide a scaled output corresponding to one volt per CFM. With flowmeter output between about 2 and 51 volts, the control valve 10 is closed. The signals from flowmeter 78 are coupled to the control processor 86 which provides a local readout of flow rate. Within processor 86, the flowmeter signals are compared to reference or trip values. If the flowmeter signal exceeds 51 volts, thereby indicating a flow rate greater than 51 CFM, the local readout can be switched to a reference value providing a "pegged" or maximum reading thereby indicating operation in the open bypass valve position and that flow is off-scale (greater than 50 CFM). The sensed flow rate also affects generation of a signal on line 103 to valve 60 switching valve 60 to the "dump" position to rapidly collapse bladder 20 in valve 10. Of course, if another type of bypass valve were used, the signal on line 103 would be used to cause the valve to transition to the open position. In addition, the flowmeter operation is switched from the "flow measurement mode" to the "valve control mode".

The sizing and restrictions within the valve 10, including the bladder 20 and its supporting pipe 34, are such that the flowrate through pipe 80 and flowmeter 78 is known for a given flow through valve 10. For example, the flow through pipe 80 can be set at 5.1 CFM for a 51 CFM flow through valve 10. If the system has been switched to a "valve control mode", the flowmeter output signals can be compared to a 5 volt reference rather than the 51 volt reference used in the flow measurement mode. Thus, in the valve control mode, so long as the flow remains greater than 50 CFM, the bypass valve 10 will remain open.

Figure 4:
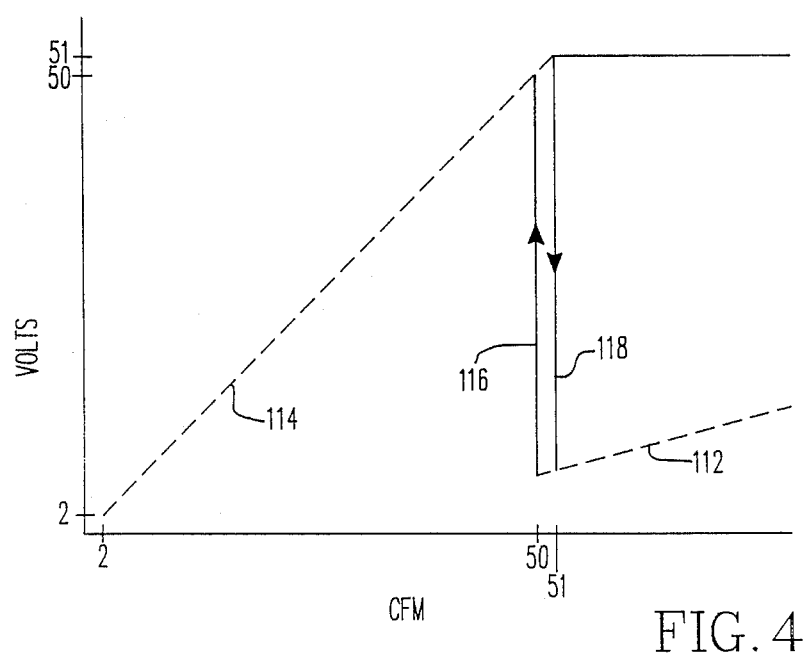
FIG. 4 illustrates operation of the flowmeter controlled inleakage monitor of FIG. 3.

If the signal from flowmeter 78 drops below the 5 volt reference value, the processor 86 will switch the system back to a flow measurement mode and generate a signal on line 103 to cause valve 60 to switch to a pressurizing position and inflate bladder 20. FIG. 4 illustrates operation of the system in response to the flowmeter 78. Note that for purposes of control and for avoiding oscillation, a hysteresis zone of about one volt, i.e., 1 CFM, is provided. Because the flowmeter 78 generally provides a precise flow measurement, the hysteresis zone can be narrowed. Furthermore, if the illustration bladder valve is used, its slow and smooth operation avoids the need for filtering of the flowmeter 78 signals since there is little opportunity for sharp transients as might be experienced with mechanical bypass valves.

It should also be noted that flow rates can be approximated when valve 10 is open by monitoring the signals from flowmeter 78. As shown in FIG. 4 at line 112, the flowmeter signals will essentially track the flow rate 114 at a different scale. Line 114 represents flowmeter response at rates less than 51 CFM. Lines 116 and 118 illustrate the switch points between flow measurement and valve control modes with a 1 CFM hysteresis band.

Figure 5:
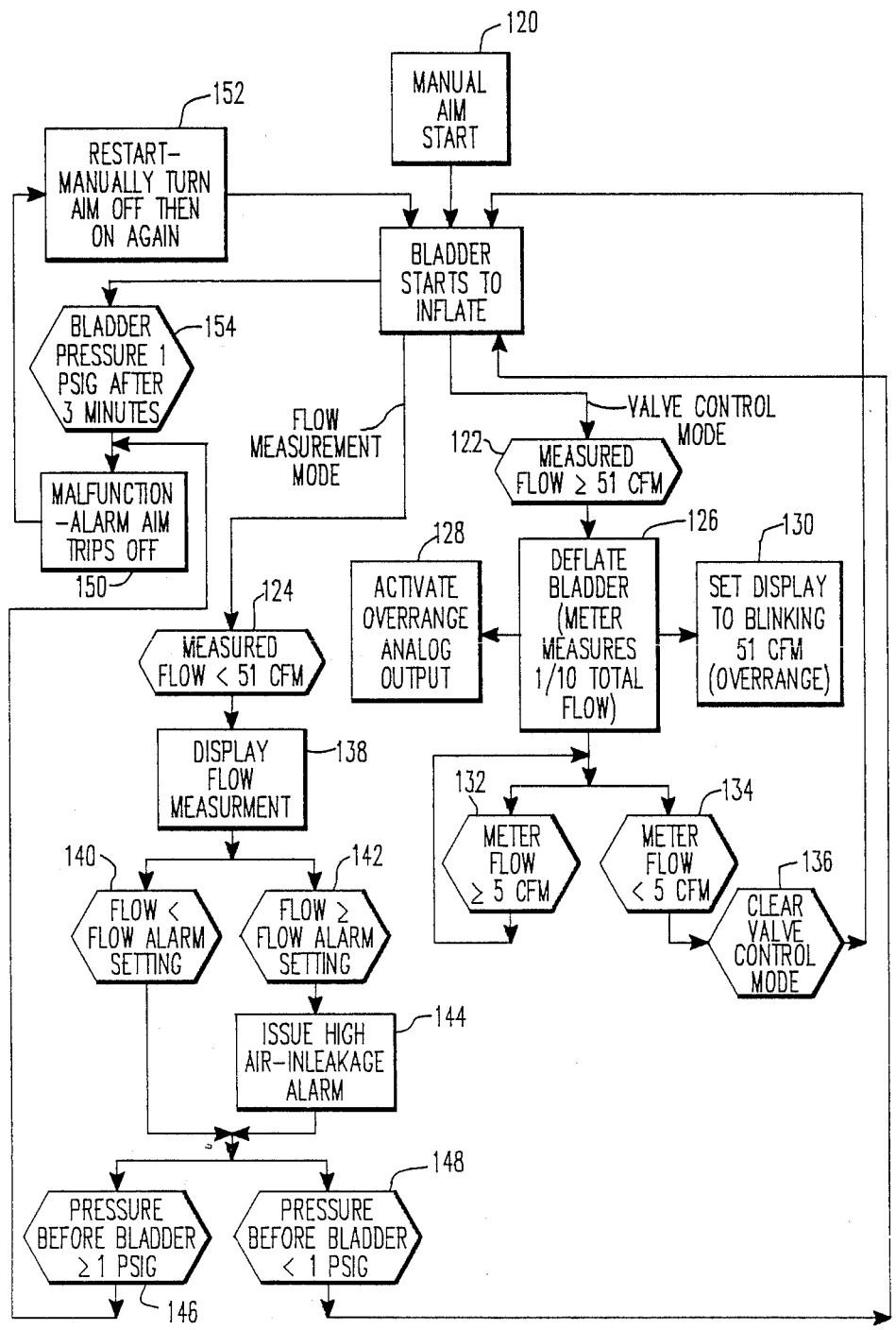
FIG. 5 is a functional flow chart illustrating operation of the inventive system.

FIG. 5 illustrates in functional flow chart form the operation of the system of FIG. 3. From a manual system start at block 120, the bypass valve 10 begins to close allowing an initial CFM flowrate measurement. Depending upon whether the CFM rate is above or below 51 CFM, the system will select either a valve control mode (CFM≧51 CFM, block 122) or a flow measurement mode (CFM<51 CFM, block 124). In the valve control mode, the bypass valve 10 is opened (bladder valve 20 deflated, block 126) and the flowmeter signals are scaled by a factor of 1/N. If N is selected to be 10, a scaled value of 5.1 volts can be established for a flow of 51 CFM. Two other features which may be implemented at this point are the overrange analog output, block 128, which provides an analog signal representative of the scaled flowmeter output for control functions and signal to set the display to blinking to indicate the overrange condition, block 130. Blocks 132 and 134 indicate the flow monitoring functions for determining when flow drops below 50 CFM. Block 136 indicates signaling for exiting the valve control mode.

If the system operates in the flow measurement mode, starting from block 124, the actual flow rate is displayed, block 138. Blocks 140 and 142 indicate checks performed to determine whether excess inleakage air is being exhausted thereby indicating a potential problem. The referenced alarm setting may be less than 50 CFM. If excess inleakage is detected, an alarm is tripped, block 144. Blocks 146 and 148 represent pressure checks. If pressure at the valve exceeds or equals 1 psig, it is indicative of an AIM malfunction and results in tripping the AIM system, block 150. Once disabled, a manual reset is required, block 152, to re-initiate AIM control. Block 154 represents a check on bladder pressure where a bladder is used for bypass valve 10. If the bladder pressure does not reach 1 psig within a selected time, for example, 2 minutes, then the AIM system is tripped since a malfunction is probable.

It will be appreciated by those skilled in the art to which the present invention relates that broad application can be given to the novel bypass valve system 10 in many embodiments other than those described herein. It will also be apparent to those skilled in the art that many modifications in structure, components and arrangements illustrated herein may be made in the practice of the invention to specific functions without departing from the spirit and scope of the invention as defined by the claims.

I claim:

1. A method for controlling the operation of a normally open bladder bypass valve in a steam turbine air inleakage exhaust vent pipe, the valve being used to bypass a flowmeter connected in a bypass pipe parallel with the valve, the flowmeter providing signals representative of flow therethrough, the method comprising the steps of:

comparing the signals from the flowmeter representative of flow therethrough to a reference signal corresponding to a first predetermined flow rate;

generating a valve closure signal when the step of comparing demonstrates that the flow through the flowmeter is less than the first predetermined flow rate;

converting the signals from the flowmeter while the valve is closed to signals for displaying air inleakage exhaust flow rate;

determining when the exhaust flow rate exceeds a second predetermined value;

generating a valve open signal for bypassing the air inleakage exhaust through the valve when the step of determining demonstrates that the flow rate through the flowmeter is greater than the second predetermined value; and repeating each of the recited steps in sequence for controlling operation of the valve.

2. The method of claim 1 and including the step of establishing the second predetermined value at a flow rate higher than the first predetermined flow rate.

3. A steam turbine air inleakage exhaust pipe control system comprising:

an exhaust vent pipe including a controllable valve positioned therein for blocking exhaust flow through said vent pipe when said exhaust flow is less than a first preselected flow rate;

an exhaust flow bypass pipe having a first end connected to said vent pipe upstream of said valve and a second end connected to said vent pipe downstream of said valve for bypassing at least a portion of said exhaust flow through said vent pipe, said vent pipe including sufficient restriction for forcing a proportional flow through said bypass pipe when said valve is open;

a flowmeter connected in said bypass pipe for providing signals representative of exhaust flow through said bypass pipe when said valve is closed and of exhaust flow through both said bypass pipe and said vent pipe when said valve is open;

means for comparing said signals from said flowmeter to signals representative of said first preselected rate when said valve is in a closed position for blocking flow through said vent pipe, said comparing means generating a valve open command when said exhaust flow rate is greater than said first preselected rate;

said comparing means being connected for comparing said signals from said flowmeter to signals representative of a second preselected flow rate when said valve is in an open position, said comparing means generating a valve closure command when said exhaust flow rate is less than said second preselected flow rate; and valve control means responsive to commands from said comparing means for opening and closing said valve.

* * * * *